US012516193B2

(12) United States Patent
Klein et al.

(10) Patent No.: US 12,516,193 B2
(45) Date of Patent: Jan. 6, 2026

(54) RUBBER-MODIFIED BITUMEN, PROCESS FOR PRODUCTION THEREOF AND USE THEREOF IN ASPHALT

(71) Applicant: LANXESS Deutschland GmbH, Cologne (DE)

(72) Inventors: Thomas Klein, Heidelberg (DE); Thomas Rossrucker, Ostringen (DE); Sandra Horstmann, Neuhofen (DE); Svenja Kusterer, Schwetzingen (DE)

(73) Assignee: LANXESS Deutschland GmbH, Cologne (DE)

( * ) Notice: Subject to any disclaimer, the term of this patent is extended or adjusted under 35 U.S.C. 154(b) by 818 days.

(21) Appl. No.: 17/630,955

(22) PCT Filed: Jul. 28, 2020

(86) PCT No.: PCT/EP2020/071277
§ 371 (c)(1),
(2) Date: Jan. 28, 2022

(87) PCT Pub. No.: WO2021/018892
PCT Pub. Date: Feb. 4, 2021

(65) Prior Publication Data
US 2022/0275211 A1    Sep. 1, 2022

(30) Foreign Application Priority Data
Aug. 1, 2019   (EP) ..................... 19189591

(51) Int. Cl.
| C08L 95/00 | (2006.01) |
| C08K 5/372 | (2006.01) |
| C08L 19/00 | (2006.01) |
| C09D 5/08 | (2006.01) |
| C09D 195/00 | (2006.01) |

(52) U.S. Cl.
CPC ............. *C08L 95/00* (2013.01); *C08K 5/372* (2013.01); *C08L 19/00* (2013.01); *C09D 5/08* (2013.01); *C09D 195/00* (2013.01)

(58) Field of Classification Search
CPC .......... C08L 95/00; C08L 19/00; C08L 17/00; C08L 2555/34; C08K 5/372
See application file for complete search history.

(56) References Cited

U.S. PATENT DOCUMENTS

| 4,554,313 A | 11/1985 | Hagenbach et al. |
| 10,844,190 B2 | 11/2020 | Klein et al. |
| 2018/0362724 A1 | 12/2018 | Klein et al. |

FOREIGN PATENT DOCUMENTS

| EP | 2955202 A1 | 12/2015 |
| WO | 08148706 A1 | 12/2008 |
| WO | 2008148706 A1 | 12/2008 |
| WO | 11138412 A1 | 11/2011 |
| WO | 2011138412 A1 | 11/2011 |

OTHER PUBLICATIONS

English Machine Translation of WO2011138412 (A1) obtained on Feb. 10, 2024 from https://worldwide.espacenet.com/publicationDetails/biblio?DB=EPODOC&II=0&ND=3&adjacent=true&locale=en_EP&FT=D&date=20111110&CC=WO&NR=2011138412A1&KC=A1 (Year: 2011).*
European Search Report from corresponding European Application No. 19189591, dated Sep. 26, 2019, two pages.
Rajan V V et al: "Science and technology of rubber reclamation With special attention to NR-based waste latex products", Progress in Polymer Science, Pergamon Press, Oxford, GB, Bd. 31, Nr. 9, Sep. 2006, pp. 811-834.
Shell Bitumen Handbook, Fifth Edition, 2003, Thomas Telford Publishing, London, UK, three pages.
Abele M et al: Neue Erkenntnisse auf dem Gebiet der chemisch beschleunigten Mastikation , Kautschuk und Gummi—Kunststoffe, Verlag, Heidelberg, DE, Bd. 42, Nr. 3, 1. Jan. 1989, pp. 299-216, Abstract.

* cited by examiner

*Primary Examiner* — Catherine S Branch
*Assistant Examiner* — Olga Lucia Donahue
(74) *Attorney, Agent, or Firm* — Nicanor A. Kohncke; Christopher L. McDavid; Ewa M. Wozniak

(57) ABSTRACT

The present invention relates to novel rubber-modified bitumen, to improved processes for producing rubber-modified bitumen using vulcanized rubber and to the use thereof in asphalt.

5 Claims, No Drawings

RUBBER-MODIFIED BITUMEN, PROCESS FOR PRODUCTION THEREOF AND USE THEREOF IN ASPHALT

The present invention relates to novel rubber-modified bitumen, to improved production processes using vulcanized rubber and to the use thereof in asphalt.

PRIOR ART

Rubber-modified bitumen, so-called upgraded bitumen, has the advantage over unmodified bitumen of constant viscoelastic properties upon variation of temperature: for instance, it is not as soft in extreme heat and not as brittle at low temperatures, and also has an increased lifetime.

Rubber-modified bitumen may be produced by admixture of an uncrosslinked elastomer or a sulfur-crosslinked rubber. The addition of uncrosslinked elastomer may require subsequent crosslinking with sulfur or polysulfides; see U.S. Pat. No. 4,554,313. This route is very costly by virtue of the materials used alone.

Due to the high cost of the elastomers, use has in the past been made of the large amount of rubber tyres generated, i.e. sulfur-crosslinked rubber as a source of substituted material.

However, sulfur-vulcanized (crosslinked) rubber is relatively insoluble in bitumen and the reutilization thereof in bitumen is therefore problematic (Shell Bitumen Handbook, Shell UK, 2003 ISBN 0 7277 3220 X, page 79). Bitumen is stored and transported at high temperature, it being necessary to keep it homogeneous. Incorporated sparingly soluble or sparingly dispersible elastomers or else sulfur-crosslinked rubber settle out in the mixture stored at high temperature. There is a difference in the performance properties of modified bitumen from different storage zones, thus resulting in quality problems in roadbuilding. The purpose of adding elastomers is to achieve the greatest possible effects in terms of improving elastic properties using the smallest possible amount of added material. The elasticity of the rubber and the thus-modified bitumen depends on the number of sulfur bridges formed during vulcanization. Devulcanization reduces the sulfur bridges and thus the elasticity.

EP-A3337851 discloses devulcanizing vulcanized rubber at temperatures of at least 140° C. with less than 5% by weight of dialkyl polysulfide to enhance the solubility of rubber in hot bitumen; however the elastic properties of the thus-modified bitumen at road temperatures of more than 60° C., generally 60° C. to 70° C., remain unsatisfactory.

Problem Addressed by the Present Invention

Starting from the above-described prior art it is an object of the present invention to provide rubber-modified bitumen which exhibits improved elastic properties at temperatures of 60° C. and above.

It has surprisingly been found that this object may be achieved when a mixture of vulcanized rubber and $C_1$-$C_{18}$-dialkyl polysulfides is heat treated at temperatures of 130-150° C. for less than 20 minutes and subsequently admixed with the bitumen.

Subject Matter of the Invention

The present invention provides rubber-modified bitumen obtainable when
a) vulcanized rubber and 1% to 5% by weight of at least one dialkyl polysulfide of formula (I), $$R^1\text{—}S_x\text{—}R^2 \qquad (1);$$

wherein $R^1$ and $R^2$ may be identical or different and represent a linear or branched $C_1$-$C_{18}$-alkyl radical and x represents numbers from 3 to 12,
are mixed and heated to temperatures of 130° C. under mechanical stress,
b) the reaction product from a) is heat treated at 130-150° C. for less than 20 minutes, preferably 1 to 18 minutes, and
c) the reaction product from b) is mixed with bitumen.

PREFERRED EMBODIMENTS OF THE INVENTION

Step a)

The vulcanized rubber comprises sulfur-crosslinked rubbers based on polydienes of the R group, including natural rubbers (NR), butadiene rubbers (BR), styrene-butadiene rubbers (SBR), acrylonitrile-butadiene rubbers (NBR) and butyl rubbers (IIR), vulcanizates of rubbers having few double bonds or double bond-free polymer backbones from the M group, including ethylene-propylene-diene rubber (EPDM), and mixtures of the aforementioned rubbers from the R and M group.

The vulcanized rubber is preferably employed in a particle size of 0.15 to 3 mm, particularly preferably 0.2-1 mm.

To this end it may be necessary to comminute the vulcanized rubber. This is ideally effected using shredders and mills and/or cutters. Preferably employable here are 2-shaft shredders and granulators.

The employed dialkyl polysulfides are compounds of general formula (I), $$R^1\text{—}S_x\text{—}R^2 \qquad (1),$$

wherein preferably
$R^1$ and $R^2$ are identical or different and represent a linear or branched $C_5$-$C_{18}$-alkyl radical and x represents numbers from 3 to 8.

It is likewise preferable when the dialkyl polysulfides employed are those in which x in general formula (I) represents numbers from 3 to 5 and $R^1$ to $R^2$ in the general formula represent linear or branched $C_5$- to $C_{15}$-alkyl radicals.

The dialkyl polysulfides may be employed in the process according to the invention either individually or as a mixture in any desired blend with one another.

In a further embodiment of the invention the dialkyl polysulfide of formula (I) is preferably dioctyl pentasulfide and/or dioctyl tetrasulfide, particularly preferably dioctyl pentasulfide and/or dioctyl tetrasulfide whose C8-alkyl is branched.

The abovementioned dialkyl polysulfides are commercially available products.

The amount of dialkyl polysulfide is preferably 1.5% to 3% by weight, particularly preferably 1.7% to 2.5% by weight, based on the amount of vulcanized rubber.

The temperatures in step a) are preferably up to 130° C. The heating to 130° C. may be carried out at any desired heating rates.

Step a) may be performed at standard pressure or else at elevated pressure. A preferred pressure is 1 to 20 bar, particularly preferably 1 to 10 bar and very particularly preferably 1 to 3 bar.

In step a) the vulcanized rubber is preferably initially charged in the form of particles at temperatures from 0° C. to 30° C. In a further preferred embodiment of the invention this is followed by metered addition of the dialkyl polysulfide under mechanical stress. This mixture is preferably heated to 130° C. after the metered addition.

However, it is also possible to initially charge the vulcanized rubber, preferably in the form of particles, at temperatures of 0° C. to 30° C. and to effect metered addition of the dialkyl polysulfide during the heating to 130° C.

The metered addition of the dialkyl polysulfide is preferably effected via a nozzle.

Mechanical stress in the context of the invention means the use of mixing units, preferably extruders, internal mixers, high-pressure homogenizers such as, in particular, high-shear mixing units, for example Ultra-Turrax®, kneaders and/or roller mills. On a large industrial scale particular preference is given to the use of extruders and/or internal mixers, but the type of extruder and/or internal mixer is not subject to any particular restriction. On a laboratory scale the high-shear mixing apparatus is for example an Ultra-Turrax®, particularly preferably also an anchor stirrer having at least 2 blades.

Examples mentioned hereinbelow include twin-screw extruders or planetary roller extruders.

When using an internal mixer for generating mechanical stress, preference is given to internal mixers having intermeshing or tangential rotors. Particular preference is given to an internal mixer having intermeshing rotors since this makes it possible to introduce more shear energy.

The stirring speed may be adjusted according to the viscosity of the rubber-modified bitumen (RMB); in the case of an anchor stirrer having at least 2 blades the stirrer speed is preferably 150 rpm to 500 rpm, particularly preferably 180-250 rpm.

Step b)

In step b) the reaction product from a) is heat treated preferably at 135° C. to 150° C. for 1 to less than 20 minutes, preferably 1 to 18 minutes.

In a particularly preferred embodiment of the invention the heat treatment time in step b) is 5 to 15 minutes inclusive. The preferred temperature in step b) is preferably 140-145° C.

In a further embodiment of the invention step b) is carried out under mechanical stress.

Step c)

The bitumen employed in step c) refers to a mixture of different organic substances which is either naturally occurring or obtained by distillation from crude oil. Owing to its biological origin, bitumen consists mainly of carbon and hydrogen. It is a nonvolatile, dark-colored multisubstance mixture of organic substances whose viscoelastic behaviour changes with temperature. Employable bitumens in the context of the invention include all commercially available bitumen types, for example 50/70 or 70/100. This preferably includes roadbuilding bitumen according to DIN EN 12591.

The incorporation of the bitumen in step c) is preferably effected under mechanical stress which may be effected as described in step a) using mixing units, preferably extruders, internal mixers, high-pressure homogenizers, such as especially high-shear mixing apparatuses, for example an Ultra-Turrax®, kneader and/or roller mill. On a large industrial scale particular preference is given to the use of extruders and/or internal mixers, but the type of extruder and/or internal mixer is not subject to any particular restriction. On a laboratory scale the high-shear mixing apparatus is for example an Ultra-Turrax®, particularly preferably also an anchor stirrer having at least 2 blades.

Examples mentioned as preferable hereinbelow include twin-screw extruders or planetary roller extruders.

When using an internal mixer for generating mechanical stress, preference is given to internal mixers having intermeshing or tangential rotors. Particular preference is given to an internal mixer having intermeshing rotors since this makes it possible to introduce more shear energy.

The stirrer speed of at least 180 rpm is preferably established, preferably with a blade stirrer.

The temperature in step c) is preferably 140° C. to 180° C. The mixing time under mechanical stress is preferably 15 to 120 minutes, particularly preferably 30 to 60 minutes.

In a further preferred embodiment of the invention the bitumen-mixed reaction product from step c) is subsequently left to stand at 140° C. to 180° C. for up to 60 minutes ("ripening time") to complete the dissolution process.

Production of the rubber-modified bitumen is preferably carried out by means of the above-described steps a), b) and c). The process for producing rubber-modified bitumen by means of steps a), b) and c) thus likewise forms part of the subject matter of the present invention.

Further Preferred Embodiment

In one embodiment the rubber-modified bitumen comprises further additives, such as metal compounds/salts, in particular organic zinc compounds/salts, inter alia as sulfide scavengers and thus as odour neutralizers which are preferably admixed in step c).

The amount of additives is preferably 0.1% to 1% by weight.

In a further preferred embodiment the rubber-modified bitumen according to the invention is obtainable when in step c) the reaction product from b) is mixed with the bitumen and with aggregate.

In the context of the present invention aggregate preferably refers to natural aggregate granulations, preferably according to DIN EN 13043, which have preferably been subjected to mechanical workup, for example crushing and screening.

Aggregate granulations used for asphalt mixture for the construction of traffic areas must meet the requirements of DIN EN 13043 and/or TL Gestein-StB 04. Asphalt top layer mixture consists of aggregate granulations up to a maximum particle size of 16 mm.

The requirements of aggregate granulations are defined inter alia in DIN 18196 Bodenklassifikation für bautechnische Zwecke und den Technischen Lieferbedingungen für Gesteinskörnung im Straßenbau, TL Gestein-StB, 2004 edition (page 11).

The aggregate is preferably either in unbroken form (as round grain), in particular in the form of shingle, sand, gravel and grit, or in broken form.

The amount of aggregate is preferably up to 95% by weight, preferably 90% to 95% by weight, based on the total amount of rubber-modified bitumen.

In cases where the rubber-modified bitumen also comprises aggregate this is referred to as asphalt.

Further Subject Matter of the Invention

The present invention thus further provides asphalt comprising the bitumen rubber-modified according to the invention.

In the context of the invention asphalt is a naturally or industrially produced mixture comprising rubber-modified bitumen and aggregate (aggregate granulations). It is preferably used in roadbuilding for roadway systems, in high-rise construction for floor coverings, in waterway construction and in landfill construction for sealing. The mixing ratio is preferably 90-95% by weight aggregate/aggregate granulation and about 5-10% by weight bitumen. However, this ratio may be altered upwards or downwards. The admixed amount (so-called binder content) and the hardness of the bitumen (i.e. binder type) substantially alter the material characteristics.

The function of the bitumen which makes up about 4-7% of the road surface is that of a binder for the aggregate scaffold. This binder provides the asphalt with internal cohesion. It is therefore of great importance that the bitumen adheres to the aggregate surface with a high binding force.

For the bitumen it is preferable to employ the rubber-modified bitumen according to the invention. Having regard to the rubber-modified bitumen, reference is made to the foregoing.

The asphalt according to the invention is preferably obtained when a) vulcanized rubber and 1% to 5% by weight of at least one dialkyl polysulfide of formula (I),

$$R^1 - S_x - R^2 \quad (1),$$

wherein $R^1$ and $R^2$ may be identical or different and represent a linear or branched $C_1$-$C_{18}$-alkyl radical and x represents numbers from 3 to 12, are mixed and heated to temperatures up to 130° C. under mechanical stress, b) the reaction product from a) is heat treated at 130-150° C. for less than 20 minutes, preferably 1 to 18 minutes, and c) the reaction product from b) is mixed with the bitumen, wherein this is followed by mixing of the bitumen according to the invention with the aggregate, preferably using a twin-shaft batch mixer.

Alternatively, the asphalt/rubber-modified bitumen according to the invention may also be produced in situ when a) vulcanized rubber and 1% to 5% by weight of at least one dialkyl polysulfide of formula (I)

$$R^1 - S_x - R^2 \quad (1),$$

wherein $R^1$ and $R^2$ may be identical or different and represent a linear or branched $C_1$-$C_{18}$-alkyl radical and x represents numbers from 3 to 12, are mixed and heated to temperatures up to 130° C. under mechanical stress, b) the reaction product from a) is heat treated at 130-150° C. for less than 20 minutes, preferably 1 to 18 minutes, and c) subsequently mixed with aggregate and bitumen, preferably in a twin-shaft batch mixer.

Having regard to the definitions of x, $R^1$ and $R^2$, the input materials and process parameters and preferred embodiments, reference is made to the foregoing relating to the rubber-modified bitumen according to the invention.

Further Subject Matter of the Invention

The present invention further provides for the use of the rubber-modified bitumen according to the invention in high-rise construction for sealing building parts against water, for example bitumen roof membranes for roof sealing, for protection of steel against corrosion and in roadbuilding as a binder for aggregate granulations in asphalt, preferably as a road surface.

The present invention is elucidated in detail by the examples which follow, but the invention is no way restricted to the examples.

Experimental Examples

In each case 200 g of cold-ground rubber flour of the type K 0204 from MRH Mülsener Rohstoff-und Handelsgesellschaft mbH having a particle size of 0.2-0.4 mm and a polymer proportion of 58% by weight were initially charged, 2.5% dioctyl pentasulfide was added at 140° C. as the dialkyl polysulfide and the mixture was stirred at a stirring speed of 180 rpm with a modified anchor stirrer having two blades.

After the metered addition of the dioctyl pentasulfide the mixture was heat treated at a temperature of 140° C. over a period of 10 to 40 minutes. Extraction in toluene according to the standard ISO 1407:2011 was used as a model for evaluating solubility in bitumen. The higher the extractable proportion in toluene, the higher the solubility in bitumen. The change in the toluene-extractable proportion (ISO 1407:2011) is shown in table 1.

TABLE 1

| Heat-treatment time for treatment with 2.5% by weight dioctyl pentasulfide at 140° C. | Toluene-extractable proportion [%] |
|---|---|
| 0 min | 8 |
| 10 min | 13 |
| 15 min | 19 |
| 20 min | 16-17 |
| 40 min | 19 |

The comparative test without dioctyl pentasulfide gave a toluene-extractable proportion of 8% which was also achieved upon addition of 2.5% by weight % dioctyl pentasulfide without heat treatment.

Surprisingly, an extractable proportion was already established after 15 minutes which was not exceeded even after 40 minutes. This shows that the solubility improvement through heat treatment was already achieved after 15 minutes (min).

Accordingly the elastic properties of a bitumen rubber-modified according to the invention were determined after a heat treatment time of 15 minutes.

To determine the elastic properties a "Multiple Stress Creep and Recovery Test (MSCR test)" was performed according to DIN EN 16659 (2013).

In this test which better reflects the stress conditions on the road than oscillating DSR measurements the recovery in percent (R-value) was determined in 10 stress cycles comprising a stress phase with constant shear stress of 1 second duration and a subsequent destress phase of 9 seconds duration. This test was performed with three stress levels of 0.1 kPa, 1.6 kPa and 3.2 kPa. The deformations during the force-controlled cycles were captured with subdivision into three deformation magnitudes.

The maximum strain is the strain during the stress phase and the permanent strain is the strain remaining at the end of the destress phase and the viscoelastic strain quantifies the recovery of the strain during the destress phase.

From these strains the parameters recovery R and compliance J were calculated:

Recovery R=(viscoelastic strain)/(maximum strain)×100[%]

Compliance J=(permanent strain)/(shear stress)[1/kPa]

The following samples were employed for the "Multiple Stress Creep and Recovery (MSCR)" test: RMB is used as an abbreviation for rubber-modified bitumen.

The RMB is based on rubber flour of the type K 0204 from MRH Mülsener Rohstoff-und Handelsgesellschaft mbH having a particle size of 0.2-0.4 mm and a polymer proportion of 58% by weight.

The polysulfide (PS) employed was dioctyl pentasulfide of the type BA CR36 from Lanxess Deutschland GmbH A: Bitumen 50/70 (Nordbit)

B1: RMB with 15% rubber without polysulfide, mixing time: 30 min, ripening time: 60 min B2: RMB with 15% rubber without polysulfide, mixing time: 15 min, ripening time: 60 min C1: RMB with 15% rubber with 2.5% by weight PS, pre-treated according to the invention: Heat treatment time Tz: 15 Min at 140° C., mixing time: 30 min, ripening time: 60 min C2: RMB with 15% rubber with 2.5% by weight PS, pre-treated according to the invention: Heat treatment time Tz: 15 Min at 140° C., mixing time: 15 min, ripening time: 60 min D1: RMB with 15% rubber with 2.5% by weight PS, pre-treated according to EP3337851, heat treatment time Tz: 20 Min at 140° C., mixing time: 30 min, ripening time: 60 min D2: RMB with 15% rubber with 2.5% by weight PS, pre-treated according to EP3337851, heat treatment time Tz: 20 Min at 140° C., mixing time: 15 min, ripening time: 60 min The samples B1-D2 were produced as follows.

B1 and B2 (Comp.):

Cold-ground rubber flour of the type K 0204 having a particle size of 0.2-0.4 mm was using a modified anchor stirrer having two blades and at a stirrer speed of about 180 rpm stirred into bitumen 50/70 from NordBit GmbH &Co. KG until the rubber proportion made up 15% of the total mixture. The rubber/bitumen mixture was stirred at 180° C. for 30 or 15 minutes ("mixing time"), then left in a drying cabinet at 180° C. for 60 min ("ripening time") to complete the dissolution process.

C1 and C2 (Inventive):

In one experiment in each case 200 g of cold-ground rubber flour of the type K 0204 having a particle size of 0.2-0.4 mm was combined with 2.5% dioctyl pentasulfide and with a modified anchor stirrer having two blades and at a stirrer speed of about 180 rpm stirred while the mixture was heated to 130° C. The rubber mixture was then heated to 140° C. and heat treated for 15 minutes. After the heat treatment Bitumen 50/70 from NordBit GmbH &Co. KG was added until the rubber proportion made up 15% of the total mixture. The rubber/bitumen mixture was stirred at 180° C. for 30 minutes ("mixing time"), then left in a drying cabinet at 180° C. for 60 min ("ripening time") to complete the dissolution process.

D1 and D2 According to EP3337851 with 2.5% Dioctyl Pentasulfide (Comp):

In one experiment in each case 200 g of cold-ground rubber flour of the type K 0204 from MRH Mülsener Rohstoff-und Handelsgesellschaft mbH having a particle size of 0.2-0.4 mm was combined with 2.5% dioctyl pentasulfide as the dialkyl polysulfide and with a modified anchor stirrer having two blades and at a stirrer speed of about 180 rpm stirred while the mixture was heated to 130° C.

The rubber mixture was then heated to 140° C. and heat treated for 20 minutes. After the heat treating Bitumen 50/70 from NordBit GmbH &Co. KG was added until the rubber proportion made up 15% of the total mixture. The rubber/bitumen mixture was stirred at 180° C. for 30 minutes ("mixing time"), then left in a drying cabinet at 180° C. for 60 mm ("ripening time") to complete the dissolution process.

The results of the MSCR measurement according to DIN EN 16659 are reported in table 2. The test was performed at a temperature of 60° C.

TABLE 2

| Property | | Mixing/ripening time at 180° C. | A Bitumen 50/70 — | B1 without PS comp. 30/60 | B2 without PS comp. 15/60 | C1 with PS Tz = 15 min inv. 30/60 | C2 with PS Tz = 15 min inv. 15/60 | D1 with PS, Tz = 20 min comp. 30/60 | D2 with PS Tz = 20 min comp. 15/60 |
|---|---|---|---|---|---|---|---|---|---|
| R (0.1 kPa) | [%] | | 0.8 | 40.7 | 35.9 | 60.5 | 63.8 | 48.3 | 49.1 |
| R (1.6 kPa) | | | −0.6 | 34.8 | 30.8 | 52.0 | 54.8 | 35.4 | 36.9 |
| R (3.2 kPa) | | | −1.1 | 27.2 | 23.3 | 42.1 | 44.5 | 26.0 | 21.1 |
| J (0.1 kPa) | [1/kPa] | | 3.649 | 0.179 | 0.205 | 0.135 | 0.130 | 0.194 | 0.193 |
| J (1.6 kPa) | | | 3.838 | 0.203 | 0.227 | 0.170 | 0.167 | 0.258 | 0.231 |
| J (3.2 kPa) | | | 3.973 | 0.241 | 0.268 | 0.214 | 0.214 | 0.315 | 0.313 | inv. = inventive,
comp: comparative test,
Tz = heat treatment time,
PS = polysulfide As is apparent from table 2 at the short pretreatment time of the employed waste rubber of less than 20 min the recovery of the stressed bitumen shaped article is substantially higher and the compliance accordingly lower for the rubber-modified bitumen (RMB) produced according to the invention. Especially the R value (percentage recovery) of the RMB at the highest stress level of 3.2 MPa is nearly 1.5 times better using the rubber with a heat treatment time of 15 minutes (during pretreatment with the polysulfide) than for rubber-modified bitumen produced either with non-pretreated rubber (no polysulfide) or with rubber that has been pretreated with the polysulfide for 20 min, i.e. over a longer heat treatment.

Furthermore, the J values, a measure of the sensitivity of the bitumen to deforming forces, are best for the rubber treated according to the invention.

The examples thus strikingly demonstrate that the inventive pretreatment of the rubber with the shortened heat treatment time of less than 20 minutes made it possible to markedly improve the elastic properties (R and J) of bitumen modified therewith at temperatures of 60° C. The direct comparison of rubber-modified bitumen at heat treatment times of 15 and 20 minutes surprisingly shows markedly improved R and J values of the MSCR test at the shortened heat treatment time.

What is claimed is:

1. Rubber-modified bitumen obtained when
   a) vulcanized rubber and 1% to 5% by weight of at least one dialkyl polysulfide of formula (I), based on the amount of vulcanized rubber

   $$R^1-S_x-R^2 \quad (1),$$

wherein $R^1$ and $R^2$ may be identical or different and represent a linear or branched $C_1$-$C_{18}$-alkyl radical and x represents numbers from 3 to 12, are mixed and heated to temperatures up to 130° C. under mechanical stress,
   b) the reaction product from a) is heat treated at 130-150° C. for less than 20 minutes, and
   c) the reaction product from b) is mixed with bitumen.

2. The rubber-modified bitumen according to claim 1, wherein the dialkyl polysulfide of formula (I) is dioctyl pentasulfide and/or dioctyl tetrasulfide.

3. The rubber-modified bitumen according to claim 1, wherein the heat treatment time is 5 to 15 minutes inclusive.

4. The rubber-modified bitumen according to claim 1, wherein a) and/or c) are carried out under mechanical stress.

5. The rubber-modified bitumen according to claim 1, wherein in c) the reaction product from b) is mixed with the bitumen and aggregate.

* * * * *